T. S. HALL.

Double Circuit Instrument for Railroad Signals and other Purposes.

No. 4,493. Reissued Aug. 1, 1871.

Witnesses.
C. Wahlers.
Ernst Bilhuber

Inventor
Thomas S. Hall
per
Van Santvoord & Hauff
Attys

N. PETERS, Photo-Lithographer, Washington, D. C.

UNITED STATES PATENT OFFICE.

THOMAS S. HALL, OF WEST MERIDEN, CONNECTICUT.

IMPROVEMENT IN DOUBLE-CIRCUIT INSTRUMENTS FOR RAILROAD SIGNALS AND OTHER PURPOSES.

Specification forming part of Letters Patent No. 97,505, dated December 7, 1869; reissue No. 4,493, dated August 1, 1871

*To all whom it may concern:*

Be it known that I, THOMAS S. HALL, formerly of Stamford, now of West Meriden, in the county of New Haven and State of Connecticut, have invented a new and useful Improvement in Double-Circuit Instruments; and I do hereby declare the following to be a full, clear, and exact description thereof, which will enable those skilled in the art to make and use the same, reference being had to the accompanying drawing forming part of this specification, in which drawing—

Figure 1:
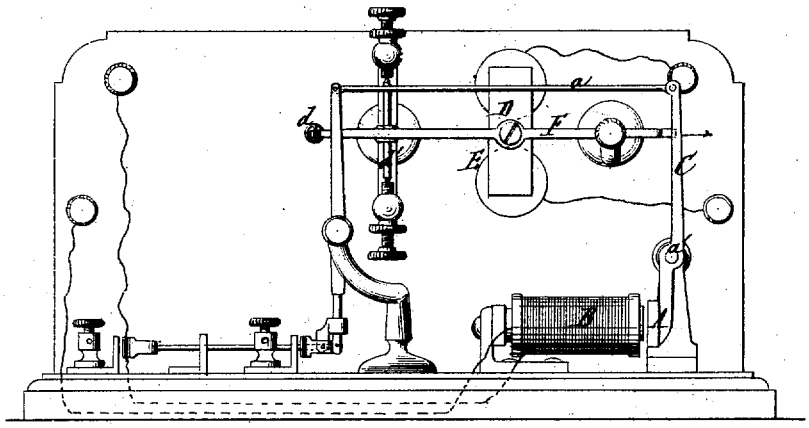
Figure 2:
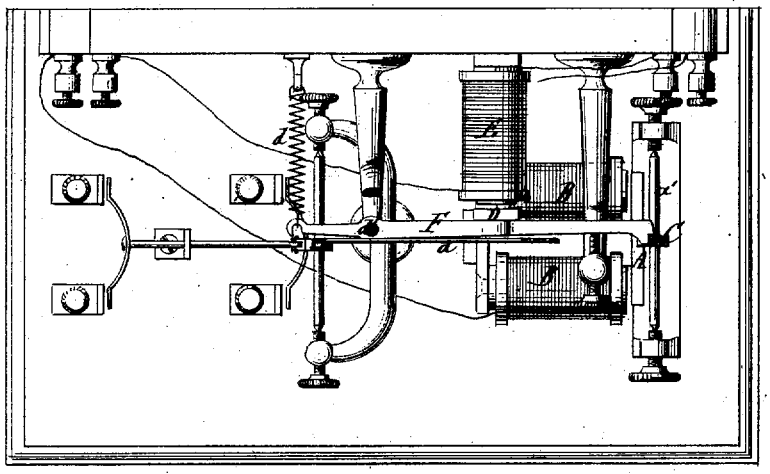

Figure 1 represents a front view of this invention. Fig. 2 is a plan or top view of the same.

Similar letters indicate corresponding parts.

This invention relates to an electro-magnetic instrument in which a locking-lever or stop is applied in combination with the armature-lever of an electro-magnet, said armature-lever serving to actuate a signal or to close the circuit through another electro-magnet, or to produce any other effect whenever the circuit through the first electro-magnet is closed, in such a manner that by the locking-lever or stop the armature-lever of the first electro-magnet is retained in position, after the circuit through said electro-magnet has been opened, and the effect produced by said armature-lever is continued until the same is released by the locking-lever or stop. With the locking-lever is combined a reversing-magnet, so that by closing the circuit through this reversing-magnet the locking-lever is withdrawn from the armature-lever of the first magnet, and as said armature-lever is permitted to fall back the effect produced by its action is reversed—that is to say, if, by its action, a signal has been displayed, the signal is taken off, when said armature-lever falls back; or if, by its action, a circuit through another magnet has been closed, the circuit is opened, when said armature-lever falls back.

In the drawing, A designates the armature of an electro-magnet, B, the said armature being attached to a lever, C, which extends from a rock-shaft, *a'*, hung between the center points so that it can oscillate freely, The armature-lever C may connect by a rod, *a*, or by any other suitable means, with a signal apparatus, in such a manner that whenever the armature A is attracted by its magnet, and consequently the armature-lever C swings back in the direction of the arrow marked near it in Fig. 1, the signal is displayed or set in motion; and whenever the armature-lever is allowed to fall back to its original position, the signal is taken off or stopped. The armature-lever C may, however, be connected to any other device or mechanism; for instance, it may serve to open and close the circuit through another electro-magnet, so that if said armature is held back in the position in which it is brought when the armature A has been attracted the circuit through this additional magnet would be closed, and as soon as the armature-lever C is allowed to fall back to its original position, the circuit through the additional magnet would be broken. If the armature-lever C serves to actuate a signal, the signal is displayed or kept in motion as long as the circuit through the helix of the magnet B is closed, and the signal is taken off or stopped as soon as the circuit through the helix B is opened; but in many cases it is desirable or requisite to keep the signal displayed or in motion after the circuit through the helix B has been opened, and to take off or stop the signal by other means. This object I have attained by a stop-lever or latch, F, which swings on a vertical rock-shaft, *d'*, supported between center-points, and which is subjected to the action of a spring, *d*, which has a tendency to hold the outer end of said lever up against the armature-lever C as long as the armature A connected to this lever is not attracted by its magnet; but as soon as the armature A is attracted, and consequently the armature-lever C swings back in the direction of the arrow marked near it in Fig. 1, the end of the stop-lever F is carried in front of the lever C, and this last-named lever is prevented from returning to its original position, even after the circuit through the helix B has been opened, until the stop-lever F is taken off. The taking off the stop-lever can be effected by various means; but in practice, and particularly in employing my double-circuit instrument for the operation of railway signals, I use the following means: To the stop-lever F I connect the armature D of an electro-magnet, E, and as soon as the circuit through the helix of this electro-magnet is closed, and consequently the armature D is attracted, the stop F is withdrawn from the armature-lever C of the electro-magnet B and said lever C is permitted to return to its original position.

By these means I am enabled to put on a signal by closing the circuit through the helix B momentarily, then keep the signal on by the action of the stop F on the lever C, and finally take off the signal by momentarily closing the circuit through the helix D.

What I claim as new, and desire to secure by Letters Patent, is—

1. The method, substantially as herein described, of continuing the action or effect produced by closing the circuit through an electro-magnet by means of a stop, F, which serves to lock the armature-lever C of such magnet in its closing position after the circuit through its electro-magnet has been opened, substantially in the manner set forth.

2. The combination of a reversing-magnet, E, and armature D with the stop F and armature-lever C, substantially as and for the purpose described.

THOMAS S. HALL.

Witnesses:
W. HAUFF,
E. F. KASTENHUBER.